Jan. 10, 1933.        B. N. WALLIS        1,894,011

CONSTRUCTION OF FUSELAGE OR OTHER BODIES OF AIRCRAFT

Filed Aug. 15, 1932      4 Sheets-Sheet 1

Jan. 10, 1933.  B. N. WALLIS  1,894,011
CONSTRUCTION OF FUSELAGE OR OTHER BODIES OF AIRCRAFT
Filed Aug. 15, 1932   4 Sheets-Sheet 3

Jan. 10, 1933.   B. N. WALLIS   1,894,011
CONSTRUCTION OF FUSELAGE OR OTHER BODIES OF AIRCRAFT
Filed Aug. 15, 1932   4 Sheets-Sheet 4

Patented Jan. 10, 1933

1,894,011

UNITED STATES PATENT OFFICE

BARNES NEVILLE WALLIS, OF WEYBRIDGE, ENGLAND, ASSIGNOR TO VICKERS (AVIATION) LIMITED, OF WEYBRIDGE, ENGLAND

CONSTRUCTION OF FUSELAGE OR OTHER BODIES OF AIRCRAFT

Application filed August 15, 1932, Serial No. 628,910, and in Great Britain August 27, 1931.

In constructing fuselage and other bodies of cylindrical, elliptical and other curved section, a constructor has the choice between making a stressed skin construction or a rectangular or polygonal analytical structure having longitudinal members and diagonal bracing members, the exterior form being secured by "formers" giving the required rounded contour. In the case of a stressed skin construction, excessive weight is necessary, while in the analytical structure the longitudinals and bracing members make up an interior frame, inscribed within the rounded streamline form, with consequent waste of weight in providing "formers" and also of valuable space which should be afforded within the fuselage, especially in the case of passenger and troop carrier machines.

The object of this invention is to provide such an analytical structure in which the waste of valuable space is avoided, and the weight due to "formers" and/or stressed skin construction is saved.

To achieve these objects it is proposed, according to this invention, that the bracing members, instead of being straight and so reducing the interior space of the structure, are formed with their axes as geodesics in or parallel to the contour which it is desired to secure for the structure, the structure being "double" or "cross" braced in every panel. The bowing outwards of single bracing members would involve difficulties due to the endwise compression loads tending to increase the bow of such bracing members and the endwise tension loads tending to decrease the bow of said bracing members; and the provision of outwardly bowed bracing members, themselves designed to resist such endwise compression and tension stresses would entail considerable increase in weight of such members and would thus rob the analytical structure of its advantages in reducing the weight of the structure as compared with the stressed skin construction, whose chief disadvantage is the weight entailed. It should, however, be observed that with the disposition of members according to this invention under all torsional and shear forces to which the fuselage is subjected, the compression forces in one bracing member tending to increase the bow are equal to the tension forces in the opposite handed bracing member tending to decrease or straighten the bow, so that by securing the opposed bracing members together at their point of intersection in each panel the forces tending to increase the bow of one of said members are balanced by the forces tending to decrease or straighten the bow of the other member. This point of intersection thus provides a point of fixation for each bracing member, the other end of each member being fixed at its intersection point with the longitudinal members. The angle turned through by the osculating plane of the geodesic is thus halved in each panel, this device therefore having the effect, according to the well-known laws connecting applied lateral forces with the length and the fixation of beams, of reducing the bending moment in each portion of each bracing bar to approximately 1/12th of the value it would have if the full length of the bracing bar in each panel were involved.

It is a feature of this invention that the axis of each bracing member is enabled to retain its shape as a true geodesic in the required surface by constructing it with great radial depth in comparison with its width, its innate radial stiffness thus simulating the effect of the rigidity of a solid body in supplying the forces normal to the osculating plane which are required to maintain a loaded geodetic string in equilibrium.

The bracing members are preferably made of channel cross-section with the web arranged radial and the flanges arranged parallel to the required surface. In this way, the bowed bracing members may be built very little heavier than in the case where straight diagonal bracing members are employed and the additional space within the fuselage hitherto secured by a stressed skin construction may, in accordance with this invention, now be secured in an analytical structure of considerably less weight than such stressed skin construction, or rectangular analytical construction, by reason of the omission of the "former" members.

In a preferred construction, the frame of an analytical structure on which the fuselage is to built, is constructed of tubular longitudinal members assembled together in bays, each bay comprising lengths of tube terminating in sleeve connections adapted to connect to the adjacent sleeve connections of the neighbouring bay, and adapted also to receive the bracing members for staying the tubes in each section apart and for transmitting and resisting torsional and shear forces in the structure. Such bracing members are constructed to the required curvature to suit the rounded form of the fuselage required, and in each panel of each bay the bracing members cross and intersect each other and are securely connected to each other at the point of intersection.

In assembling the bays together, a bracing member crossing a panel of one bay, becomes continuous with a similar member crossing the diagonally adjacent panel of the next bay, and as these members follow a "geodetic" line the bracing members when continued from bay to bay constitute a continuous geodesic winding from one end of the fuselage to the other. In a similar way the second bracing member in the first bay joins with the corresponding bracing member in the adjacent bays and continues in a geodetic line winding in the opposite hand to the first geodesic from one end of the fuselage to the other.

Fuselages or frames of aircraft have been proposed which are constructed of continuous longitudinal members about which are arranged two series of helically wound laths which intersect on the longitudinal members to which they are secured. In this proposal, however, the longitudinal members were not braced by bracing members which cross between the longitudinal members, while the laths have a much smaller radial depth than width, and, consequently, this construction if kept within the required limits of weight would be quite unsuitable for receiving the bonding and the torsion loads to which fuselages and the like are subjected.

The invention will now be described with reference to the form of construction illustrated on the accompanying drawings, in which:—

Figure 1:
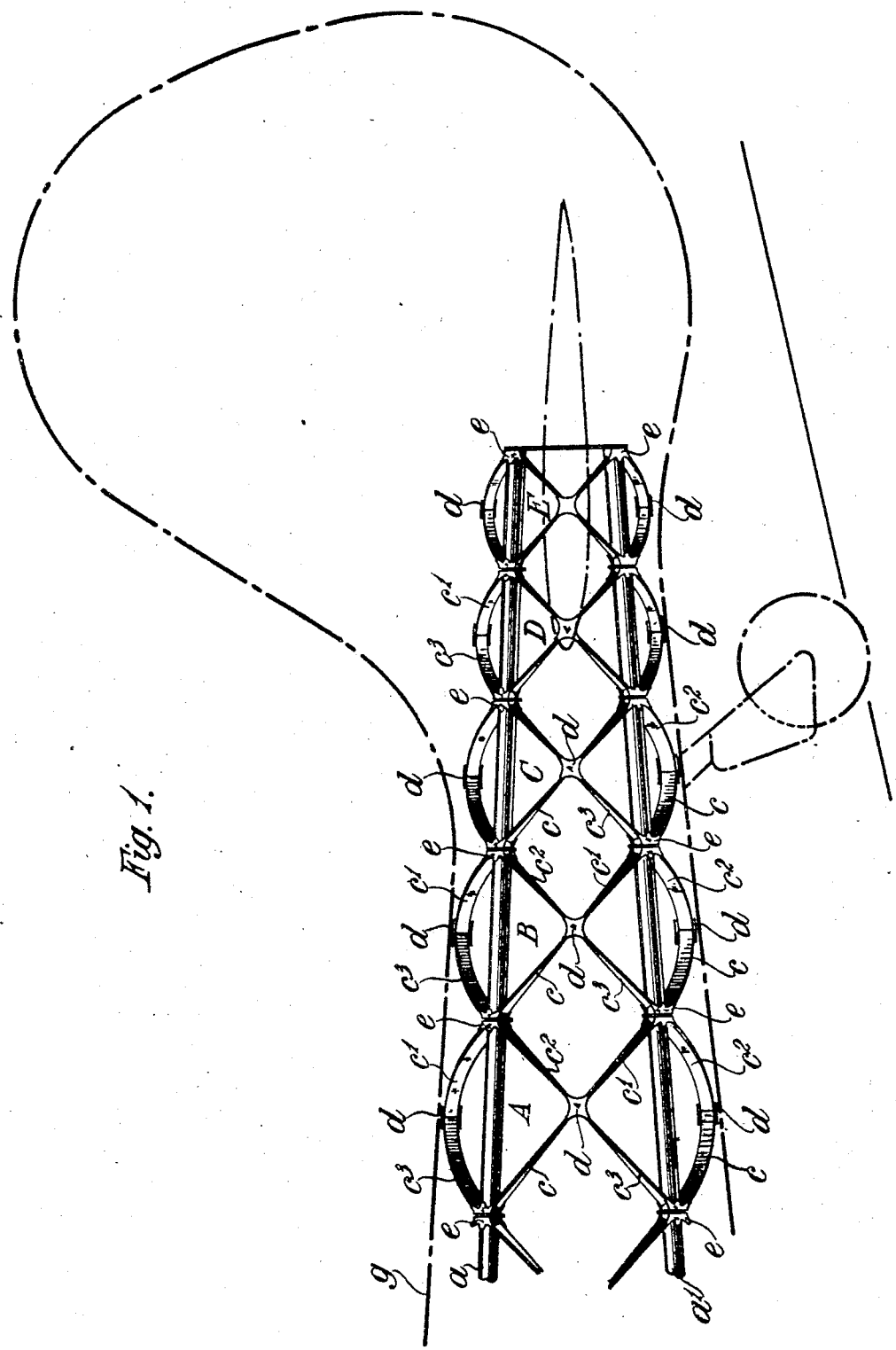
Fig. 1 is a side elevation illustrating the structure as applied to the tail end of the fuselage showing the longitudinal members built up in bays and showing the bracing members, but omitting for clearness the stringers and indicating the fuselage in chain dotted lines.
Figure 2:
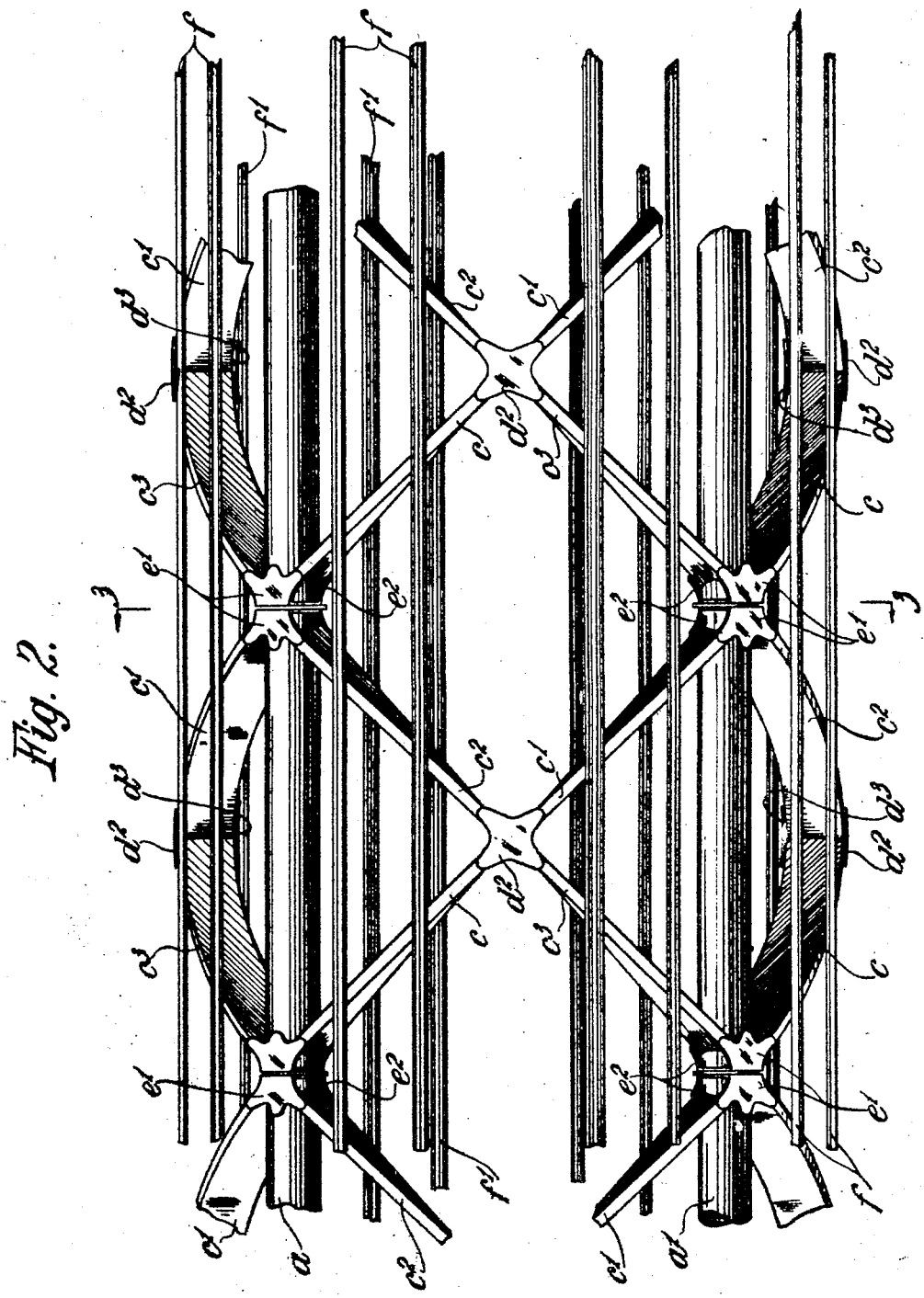
Fig. 2 is a side elevation of one bay and parts of its adjacent bays drawn to an enlarged scale in order to show the construction of the tubular members, bracing members and stringers, the bays having a parallel contour instead of a tapering contour as in Fig. 1.

As shown in Fig. 1, the structure is composed of four tubular booms, only two of which are shown and marked $a$ and $a^1$. These booms are made up in bays marked A, B, C, D and E and are provided at each end of each bay with strengthening sleeves (not shown) by which the booms in one bay are fixed to the corresponding booms in the next adjacent bay. Each bay comprises four panels, two side panels and top and bottom panels. In each of these panels there is arranged bracing members $c, c^1, c^2, c^3$. One set of these bracing members are arranged in each panel in the construction illustrated and these are repeated in the remaining side panel and in the top and bottom panels. The bracing members are bowed outwardly and are securely connected to each other at the point of intersection by the intersecting fitting marked $d$ and to the tubular members by end fittings marked $e$.

Figure 3:
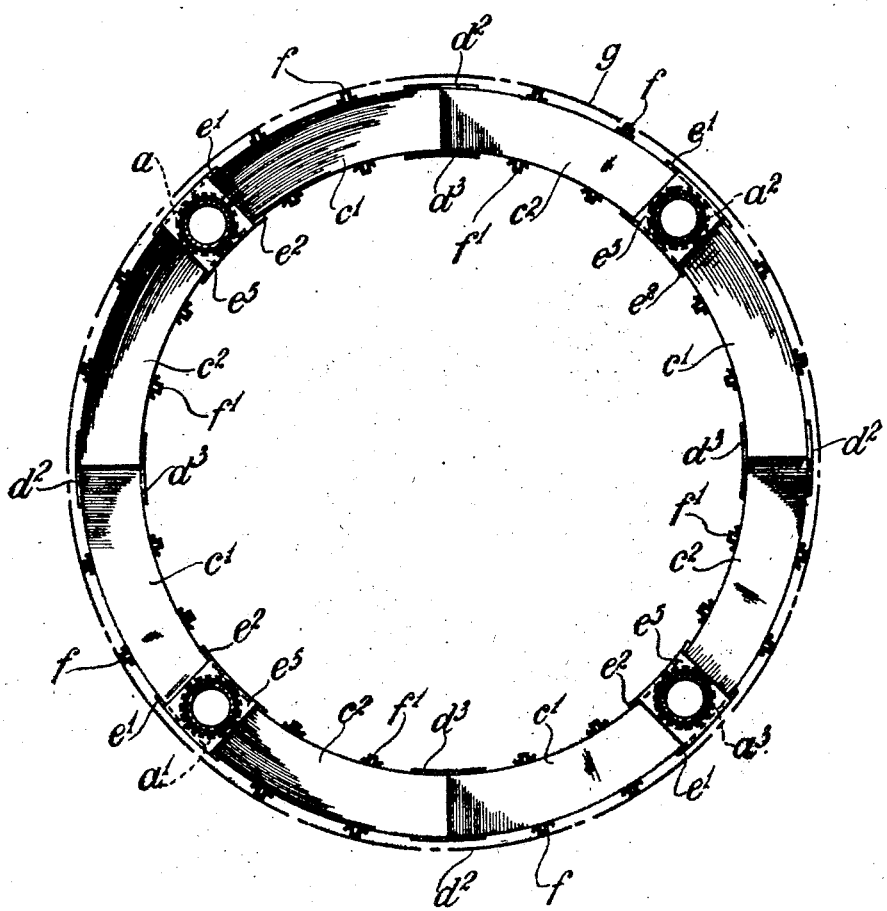
Fig. 3 is a section on the line 3—3 in Fig. 2.
Figure 4:
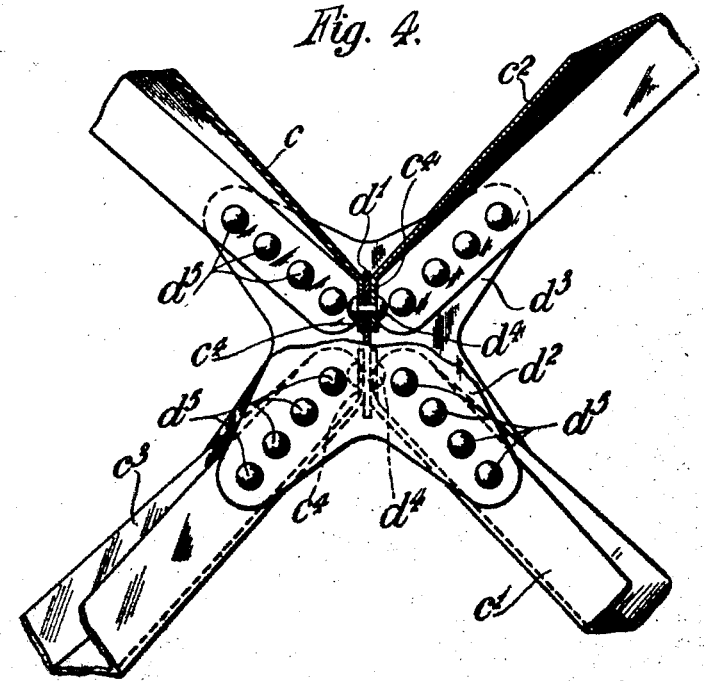
Figs. 4 and 5 are detail views drawn to an enlarged scale of the joints for the bracing members.
Figure 5:
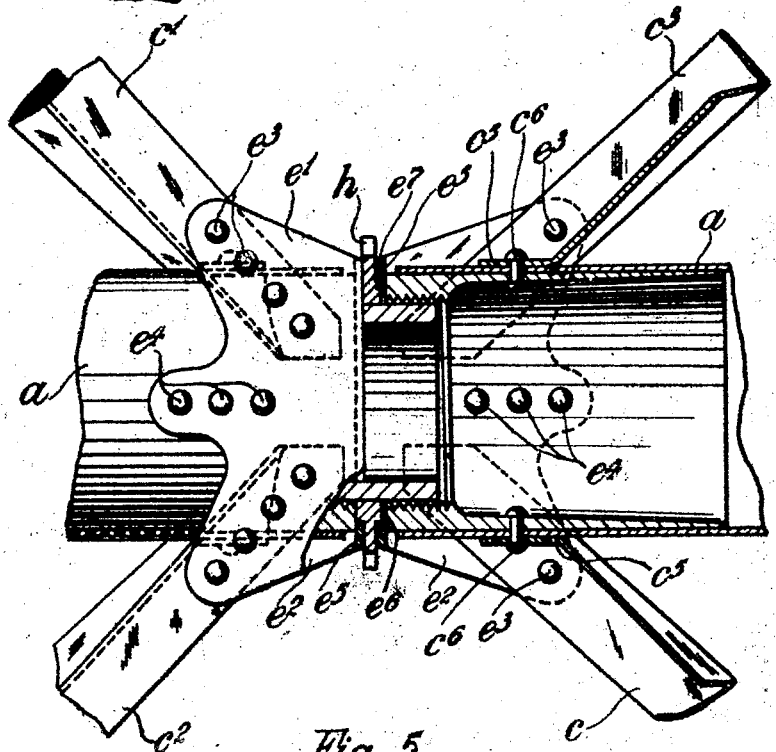

In the particular construction illustrated and as shown more clearly in Figs. 2–5, the bracing members $c, c^2$ and the opposite bracing members $c^2, c^3$ are divided into separate halves which connect to the member $d$. Each half bracing member $c$ or $c^1$ or $c^2$ or $c^3$ is constructed of channel-shape in cross-section and such half bracing member is formed at one end with an extension $c^4$ of its web which, as shown in Fig. 4, is bent at an angle to its web, so as to fit flat against a plate $d^1$ extending between two side star-shaped plates $d^2$, $d^3$ which fit against either sides of the flanges, these plates $d^1, d^2, d^3$ constituting the intersecting fitting indicated generally by $d$ in Fig. 1. The extensions $c^4$ on opposed half bracing members such as $c$ and $c^2$ are fixed together by a common rivet $d^4$, while the flanges of the half bracing members are also secured to the plates $d^2, d^3$ by rivets $d^5$. The other end of each of these half bracing members has its web cut away and bent inwardly to provide a part $c^5$, shown in Fig. 5, which fits partly around the exterior of the tubular boom $a$, to which it is secured by a rivet $c^6$. The flanges at this end of the half bracing member extend one on either side of the tubular boom where they are fixed to the end fittings $e$ carried on the boom. In an alternative construction, one bracing member may be made continuous, the intersecting opposite handed bracing member only being made in halves. The end fittings are constructed as illustrated in Fig. 5 and comprises a U-shaped member having two parts marked $e^1, e^2$ serving as gusset plates one on either side of the boom. The flanges of the four half bracing members $c^1$, $c^2, c^3, c$ are secured to the gusset plates by rivets $e^3$ and the gusset plates are secured by rivets $e^4$ to the tubular booms, all four of which are shown in Fig. 3 and marked $a$, $a^1$, $a^2$ and $a^3$. The middle $e^5$ of the end fitting is provided with a hole $e^6$ by which it is seated on the axially extending flange $e^7$ of the key plate $h$ for connecting the tubular booms together.

Outside the structure thus formed and in order to avoid quilting of the fabric, stringers $f$ are attached in the direction of the length of the booms and around these stringers fabric covering $g$, indicated by chain dotted lines in Figs. 1 and 3, may be applied and secured in any convenient manner. Similar stringers $f^1$ may also be attached inside the structure thus formed if required, these stringers $f^1$ also extending in the direction of the length of the booms and to which any suitable material may be applied and secured to form interior walls.

Although a construction has been described and illustrated employing tubular members and web channels, it is clear that any alternative forms of construction, such as lattice braced booms and bracing bars could be employed.

What I claim as my invention and desire to secure by Letters Patent is:—

1. An aircraft body structure comprising in combination an outside covering, a structure for supporting and shaping the covering constituted by longitudinal members, opposed bracing members having their exterior borders constituting geodetic lines in the external contour of the structure, said bracing members being of greater radial depth than width, and means for attaching the opposed bracing members to each other where they intersect.

2. An aircraft body structure comprising in combination an outside covering, a structure for supporting and shaping the covering constituted by longitudinal members, opposed bracing members having their exterior borders constituting geodetic lines in the external contour of the structure, each bracing member being constructed in two halves and being of greater radial depth than width, and fittings for securing the halves of the bracing members to each other and to the halves of the opposed bracing members at points of intersection of said bracing members.

3. An aircraft body structure comprising in combination an outside covering, a structure for supporting and shaping the covering constituted by longitudinal members, opposed bracing members having their exterior borders constituting geodetic lines in the external contour of the structure, said bracing members being of greater radial depth than width, gusset plates interconnecting the ends of the bracing members with the longitudinal members, and fittings for securing the bracing members together at their points of intersection.

4. An aircraft body structure comprising in combination an outside covering, a structure for supporting and shaping the covering constituted by longitudinal members, opposed bracing members having their exterior borders constituting geodetic lines in a surface parallel to the external surface of the structure, each bracing member being constructed in two halves and being of greater radial depth than width, gusset plates interconnecting one end of each half bracing member with the longitudinal members, and fittings for securing other ends of the halves of each bracing member together and to the halves of the opposed bracing member at their points of intersection.

5. An aircraft body structure comprising in combination an outside covering, a structure for supporting and shaping the covering constituted by longitudinal members, opposed bracing members intersecting intermediate the longitudinal members having their exterior borders constituting geodetic lines in the external contour of the structure, said opposed bracing members being of greater radial depth than width and being connected together at their points of intersection, and stringers extending across the bracing members parallel to the longitudinal members and serving to connect the outsides of the bracing members to the inside surface of the covering.

6. An aircraft body structure comprising in combination an outside covering interior walls, a structure for supporting and shaping said covering and walls constituted by longitudinal members, opposed bracing members intersecting intermediate the longitudinal members having their exterior borders constituting geodetic lines in the external contour of the structure, said opposed bracing members being of greater radial depth than width and being connected together at their points of intersection, and sets of stringers extending across the bracing members parallel to the longitudinal members and serving respectively to connect the outsides of the bracing members to the inside surface of the covering and the insides of the bracing members to the interior walls of the body structure.

7. An aircraft fuselage comprising an outer fabric covering, a structure for supporting and shaping the covering constituted by longitudinal members, channel section opposed bracing members intersecting intermediate the longitudinal members, gusset plates securing the ends of the bracing members to the longitudinal members, and fittings securing the bracing members together at their intersections, said bracing members having a greater radial depth than width, having their exterior borders forming goedetic lines in the external contour of the fuselage, and having their flanges and webs shaped to fit the longitudinal members and the fittings at their intersections.

8. An aircraft fuselage comprising an outer fabric covering, a structure for supporting and shaping the covering constituted by longitudinal members, channel section bracing members intersecting intermediate the longitudinal members, gusset plates securing the ends of the bracing members to the longitudinal members, and fittings securing the bracing members together at their intersections, said bracing members having a greater radial depth than width, having their exterior borders forming geodetic lines in the external contour of the fuselage, and having their flanges and webs shaped to fit the longitudinal members and the fittings at their intersections, and stringers extending across the bracing members parallel to the longitudinal members and serving to connect the outsides of the bracing members to the inside surface of the covering.

9. An aircraft fuselage comprising an outer fabric covering, a structure for supporting and shaping the covering constituted by longitudinal members, channel section opposed bracing members intersecting intermediate the longitudinal members, gusset plates securing the ends of the bracing members to the longitudinal members, and fittings securing the bracing members together at their intersections, one of said bracing members being continuous between the longitudinal members and the opposed bracing member being formed in two halves united together by the fitting at the intersection of the bracing members, all the bracing members having their exterior borders forming geodetic lines in the external contour of the fuselage, having a greater radial depth than width, and having their flanges and webs shaped to fit the longitudinal members and the fittings at their intersections.

10. An aircraft fuselage comprising an outer fabric covering, a structure for supporting and shaping the covering constituted by longitudinal members, channel section opposed bracing members intersecting intermediate the longitudinal members, gusset plates securing the ends of the bracing members to the longitudinal members, and fitting securing the bracing members together at their intersections, said bracing members being made in two halves united together and secured to the halves of the opposed bracing member by the intersecting fitting, all the bracing members having their exterior borders forming geodetic lines in the external contour of the fuselage, having a greater radial depth than width, and having their flanges and webs shaped to fit the longitudinal members and the fittings at their intersections.

In witness whereof I have hereunto set my hand.

BARNES NEVILLE WALLIS.